US009547379B2

(12) United States Patent
Fu et al.

(10) Patent No.: US 9,547,379 B2
(45) Date of Patent: Jan. 17, 2017

(54) METHOD, AIR MOUSE, AND SET TOP BOX FOR CONTROLLING AIR MOUSE

(71) Applicant: Huawei Technologies Co., Ltd., Shenzhen (CN)

(72) Inventors: Rao Fu, Shenzhen (CN); Jun Lu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 85 days.

(21) Appl. No.: 14/565,829

(22) Filed: Dec. 10, 2014

(65) Prior Publication Data

US 2015/0109209 A1    Apr. 23, 2015

Related U.S. Application Data

(63) Continuation of application No. PCT/CN2013/085973, filed on Oct. 25, 2013.

(30) Foreign Application Priority Data

Nov. 22, 2012    (CN) .......................... 2012 1 0479353

(51) Int. Cl.
*G06F 3/0346*    (2013.01)

(52) U.S. Cl.
CPC ................................. *G06F 3/0346* (2013.01)

(58) Field of Classification Search
CPC .................. G06F 17/30058; G06F 2203/0381; G06F 2203/04805; G06F 3/038; G06F 3/0482; G06F 3/0483; G06F 3/04855; G06F 17/30017; G06F 3/0346
See application file for complete search history.

(56) References Cited

U.S. PATENT DOCUMENTS 6,028,609 A  *  2/2000  Kawakami ............. G06F 3/011
                                                              345/474
6,191,781 B1     2/2001  Chaney et al.
(Continued)

FOREIGN PATENT DOCUMENTS

CN            101178628 A       5/2008
CN            101320297 A      12/2008
(Continued)

OTHER PUBLICATIONS

Partial English Translation and Abstract of Chinese Patent Application No. CN101178628A, Mar. 13, 2015, 6 pages.
(Continued)

*Primary Examiner* — Gerald Johnson
(74) *Attorney, Agent, or Firm* — Conley Rose, P.C.

(57) ABSTRACT

A method for controlling an air mouse is disclosed. The method includes receiving a control mode of an air mouse sent by a set top box; acquiring angular velocities and moving time of the air mouse at various directions; determining speeds of the air mouse at various directions according to the control mode and the angular velocities of the air mouse at various directions; and calculating displacements of the air mouse at various directions according to the moving time and the speeds of the air mouse at various directions, and sending the displacements of the air mouse at various directions to the set top box, so as to control movement of a screen cursor.

8 Claims, 10 Drawing Sheets

(56) References Cited

U.S. PATENT DOCUMENTS

| | | | | |
|---|---|---|---|---|
| 2010/0182235 A1* | 7/2010 | Niikura | ............ | G06F 3/02 345/158 |
| 2014/0092011 A1* | 4/2014 | De Foras | ............ | G06F 3/017 345/157 |

FOREIGN PATENT DOCUMENTS

| | | |
|---|---|---|
| CN | 101398719 A | 4/2009 |
| CN | 101398721 A | 4/2009 |
| CN | 101398722 A | 4/2009 |
| CN | 101634907 A | 1/2010 |
| CN | 101783864 A | 7/2010 |
| CN | 101977291 A | 2/2011 |
| CN | 102043475 A | 5/2011 |
| CN | 102184040 A | 9/2011 |
| CN | 102221888 A | 10/2011 |
| CN | 102457687 A | 5/2012 |
| CN | 202454057 U | 9/2012 |
| CN | 105741527 A | 7/2016 |
| TW | 200915144 A | 4/2009 |
| TW | 201135537 A | 10/2011 |

OTHER PUBLICATIONS

Partial English Translation and Abstract of Chinese Patent Application No. CN101320297A, Mar. 13, 2015, 3 pages.
Partial English Translation and Abstract of Chinese Patent Application No. CN101398719A, Mar. 13, 2015, 4 pages.
Partial English Translation and Abstract of Chinese Patent Application No. CN101398721A, Mar. 13, 2015, 4 pages.
Partial English Translation and Abstract of Chinese Patent Application No. CN101398722A, Mar. 13, 2015, 4 pages.
Partial English Translation and Abstract of Chinese Patent Application No. CN101634907A, Mar. 13, 2015, 3 pages.
Partial English Translation and Abstract of Chinese Patent Application No. CN101783864A, Mar. 13, 2015, 6 pages.
Partial English Translation and Abstract of Chinese Patent Application No. CN101977291A, Mar. 13, 2015, 3 pages.
Partial English Translation and Abstract of Chinese Patent Application No. CN102043475A, Mar. 13, 2015, 3 pages.
Partial English Translation and Abstract of Chinese Patent Application No. CN102184040A, Mar. 13, 2015, 3 pages.
Partial English Translation and Abstract of Chinese Patent Application No. CN202454057A, Jan. 8, 2015, 13 pages.
Partial English Translation and Abstract of Taiwan Patent Application No. 200915144A, Mar. 11, 2015, 3 pages.
Jiang, X., et al., "Design of Air-Mouse Based on Accelerometer," 2008, pp. 113-115.
"Designing a Low-Cost USB Mouse with the Cypress Semiconductor CY7C63000 USB Controller," Cypress Semiconductor Corporation, Jan. 21, 1997, 11 pages.
Eom, G., et al., "Gyro-Mouse for the Disabled: 'Click' and 'Position' Control of the Mouse Cursor," International Journal of Control, Automation, and Systems, vol. 5, No. 2, Apr. 2007, pp. 147-154.
Foreign Communication From a Counterpart Application, PCT Application No. PCT/CN2013/085973, English Translation of International Search Report dated Feb. 20, 2014, 2 pages.
Foreign Communication From a Counterpart Application, PCT Application No. PCT/CN2013/085973, English Translation of Written Opinion dated Feb. 20, 2014, 5 pages.
Partial English Translation and Abstract of Chinese Patent Application No. CN102221888, Sep. 17, 2016, 5 pages.
Foreign Communication From a Counterpart Application, Chinese Application No. 201210479353.5, Chinese Office fiction dated Jul. 29, 2016, 7 pages.

* cited by examiner

METHOD, AIR MOUSE, AND SET TOP BOX FOR CONTROLLING AIR MOUSE

CROSS-REFERENCE TO RELATED APPLICATIONS

This application is a continuation of International Application No. PCT/CN2013/085973, filed on Oct. 25, 2013, which claims priority to Chinese Patent Application No. 201210479353.5, filed on Nov. 22, 2012, both of which are hereby incorporated by reference in their entireties.

TECHNICAL FIELD

The present invention relates to the field of a mouse, and in particular, to a method, an air mouse, and a set top box for controlling an air mouse.

BACKGROUND

With a close combination of television sets and the Internet, more and more users use a television screen to replace a computer to perform web page browsing or other computer applications. During a process of operating an Internet television, an air mouse designed for the Internet television is used for performing operations. An air mouse is an input device, and operates a screen cursor like a conventional mouse. The air mouse does not need to be put on any surface, and is used by shaking or clicking in the air.

In the prior art, an air mouse collects, by using a built-in gyroscope and a gravitational acceleration sensor, angular velocities at various directions when the mouse is moving; determines moving speeds of the mouse at various directions according to correspondences between the angular velocities and the speeds at various directions, where the correspondences are obtained according to usage experience of a computer mouse; and finally determines displacements of the air mouse at various directions according to the moving time.

In a process of implementing the present invention, the inventor finds that the prior art at least has the following problems.

In a process of using an Internet television, a distance between a user and the television is greater than a distance between a user and a computer, and a screen of the Internet television is larger than a screen of the computer. A moving speed and accuracy of an air mouse controlling a screen cursor are different from those of a computer mouse controlling a screen cursor. Therefore, a solution for controlling an air mouse, which is obtained according to a computer mouse, cannot satisfy a user need.

SUMMARY

In order to solve the problem in the prior art, embodiments of the present invention provide a method, an air mouse, and a set top box for controlling an air mouse. The technical solutions are as follows.

According to a first aspect, a method for controlling an air mouse provided by an embodiment of the present invention includes receiving a control mode of an air mouse sent by a set top box; acquiring angular velocities and moving time of the air mouse at various directions; determining speeds of the air mouse at various directions according to the control mode and the angular velocities of the air mouse at various directions; and calculating displacements of the air mouse at various directions according to the moving time and the speeds of the air mouse at various directions, and sending the displacements of the air mouse at various directions to the set top box, so as to control movement of a screen cursor.

In a first possible implementation manner of the first aspect, the determining speeds of the air mouse at various directions according to the control mode and the angular velocities of the air mouse at various directions includes acquiring control curves at various directions corresponding to the control mode, where the control curves are correspondences between the angular velocities and the speeds; and determining the speeds of the air mouse at various directions according to the correspondences between the angular velocities and the speeds and the acquired angular velocities of the air mouse at various directions.

In a second possible implementation manner of the first aspect, after the acquiring angular velocities and moving time of the air mouse at various directions, the method further includes, when the angular velocity of the air mouse at any direction is less than a preset threshold, setting the angular velocity at the direction as zero.

In a third possible implementation manner of the first aspect, after the calculating displacements of the air mouse at various directions according to the moving time and the speeds of the air mouse at various directions, the method further includes determining whether an absolute value of the sum of displacements of the air mouse at various directions is less than or equal to a preset displacement; if the absolute value is less than or equal to the preset displacement, abandoning the displacements of the air mouse at various directions that are obtained through current calculation; and if the absolute value is greater than the preset displacement, performing a step of sending the displacements of the air mouse at various directions to the set top box.

According to a second aspect, a method for controlling an air mouse provided by an embodiment of the present invention includes receiving an application switching instruction when an application is switched, where the application switching instruction carries a type of the application after switching; acquiring a control mode corresponding to the type of the application, and sending the control mode to an air mouse; and receiving displacements of the air mouse at various directions sent by the air mouse, and controlling movement of a screen cursor according to the displacements of the air mouse at various directions.

In a first possible implementation manner of the second aspect, after the receiving displacements of the air mouse at various directions sent by the air mouse, and controlling movement of the screen cursor according to the displacements of the air mouse at various directions, the method further includes acquiring outline information of a screen cursor corresponding to the control mode, where the outline information includes a shape and/or color of the screen cursor; and setting the screen cursor according to the outline information of the screen cursor.

According to a third aspect, an air mouse for controlling an air mouse provided by an embodiment of the present invention includes a first receiving module configured to receive a control mode of an air mouse sent by a set top box; a first acquiring module configured to acquire angular velocities and moving time of the air mouse at various directions; a determining module configured to determine speeds of the air mouse at various directions according to the control mode and the angular velocities of the air mouse at various directions; and a first processing module configured to calculate displacements of the air mouse at various directions according to the moving time and the speeds of the air mouse at various directions, and send the displacements of the air mouse at various directions to the set top box, so as to control movement of a screen cursor.

In a first possible implementation manner of the third aspect, the determining module includes an acquiring unit configured to acquire control curves at various directions corresponding to the control mode, where the control curves are correspondences between the angular velocities and the speeds; and a determining unit configured to determine the speeds of the air mouse at various directions according to the correspondences between the angular velocities and the speeds and the acquired angular velocities of the air mouse at various directions.

In a second possible implementation manner of the third aspect, the air mouse further includes a first setting module configured to, when the angular velocity of the air mouse at any direction is less than a preset threshold, set the angular velocity at the direction as zero.

In a third possible implementation manner of the third aspect, the air mouse further includes a judging module configured to determine whether an absolute value of the sum of displacements of the air mouse at various directions is less than or equal to a preset displacement; a second processing module configured to, if the absolute value is less than or equal to the preset displacement, abandon the displacements of the air mouse at various directions that are obtained through current calculation; and a third processing module configured to, if the absolute value is greater than the preset displacement, perform a step of sending the displacements of the air mouse at various directions to the set top box.

According to a fourth aspect, a set top box for controlling an air mouse provided by an embodiment of the present invention includes a second receiving module configured to receive an application switching instruction when an application is switched, where the application switching instruction carries a type of the application after switching; a second acquiring module configured to acquire a control mode corresponding to the type of the application, and send the control mode to an air mouse; and a fourth processing module configured to receive displacements of the air mouse at various directions sent by the air mouse, and control movement of a screen cursor according to the displacements of the air mouse at various directions.

In a first possible implementation manner of the fourth aspect, the set top box further includes a third acquiring module configured to acquire outline information of a screen cursor corresponding to the control mode, where the outline information includes a shape and/or color of the screen cursor; and a second setting module configured to set the screen cursor according to the outline information of the screen cursor.

Beneficial effects brought by technical solutions provided by the embodiments of the present invention are as follows.

Applications of different types are ran so as to change a control mode of a corresponding air mouse, thereby increasing efficiency of moving, by a user, a screen cursor through an air mouse when using an Internet television, and increasing human computer interaction efficiency.

BRIEF DESCRIPTION OF THE DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DETAILED DESCRIPTION

To make the objectives, technical solutions, and advantages of the present invention clearer, the following further describes the embodiments of the present invention in detail with reference to the accompanying drawings.

Embodiment 1

Figure 1:
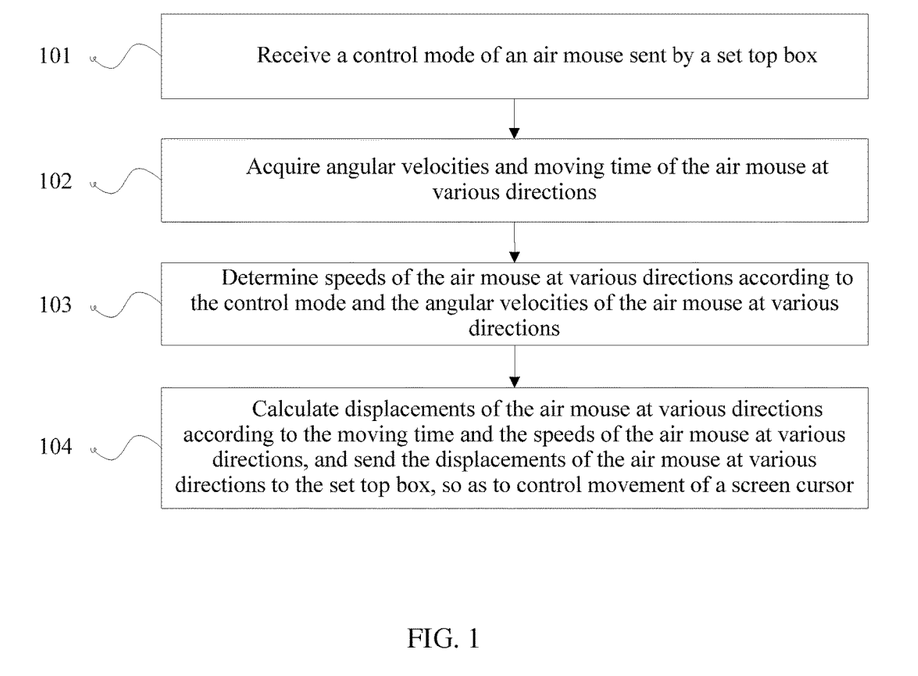
FIG. 1 is a flowchart of a method for controlling an air mouse according to Embodiment 1 of the present invention.

An embodiment of the present invention provides a method for controlling an air mouse. Referring to FIG. 1, the method procedure includes the following steps.

101: Receive a control mode of an air mouse sent by a set top box.

102: Acquire angular velocities and moving time of the air mouse at various directions.

103: Determine speeds of the air mouse at various directions according to the control mode and the angular velocities of the air mouse at various directions.

104: Calculate displacements of the air mouse at various directions according to the moving time and the speeds of the air mouse at various directions, and send the displacements of the air mouse at various directions to the set top box, so as to control movement of a screen cursor.

In the embodiment of the present invention, applications of different types are ran so as to change a control mode of a corresponding air mouse, thereby increasing efficiency of moving, by a user, a screen cursor through an air mouse when using an Internet television, and increasing human computer interaction efficiency.

Embodiment 2

Figure 2:
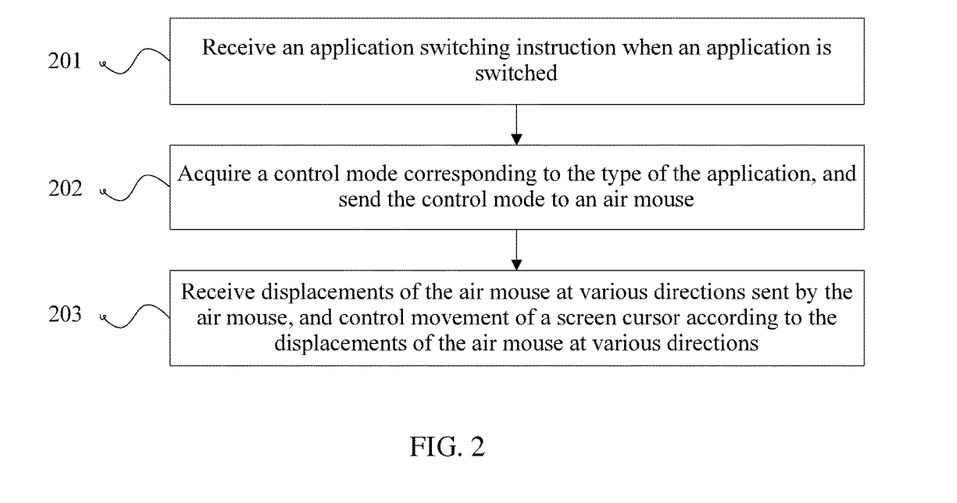
FIG. 2 is a flowchart of a method for controlling an air mouse according to Embodiment 2 of the present invention.

An embodiment of the present invention provides a method for controlling an air mouse. Referring to FIG. 2, the method procedure includes the following steps.

201: Receive an application switching instruction when an application is switched, where the application switching instruction carries a type of the application after switching.

202: Acquire a control mode corresponding to the type of the application, and send the control mode to an air mouse.

203: Receive displacements of the air mouse at various directions sent by the air mouse, and control movement of a screen cursor according to the displacements of the air mouse at various directions.

In the embodiment of the present invention, applications of different types are ran so as to change a control mode of a corresponding air mouse, thereby increasing efficiency of moving, by a user, a screen cursor through an air mouse when using an Internet television, and increasing human computer interaction efficiency.

Embodiment 3

Figure 3A:
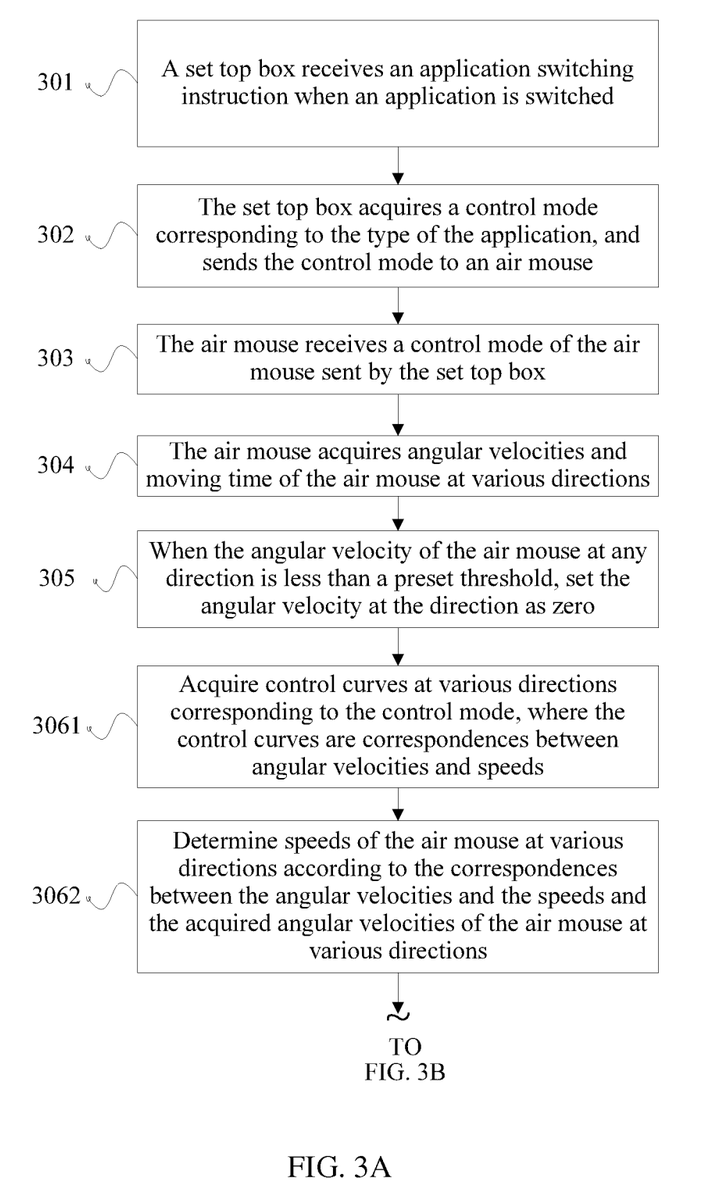
FIG. 3A and FIG. 3B are flowcharts of a method for controlling an air mouse according to Embodiment 3 of the present invention.
Figure 3B:
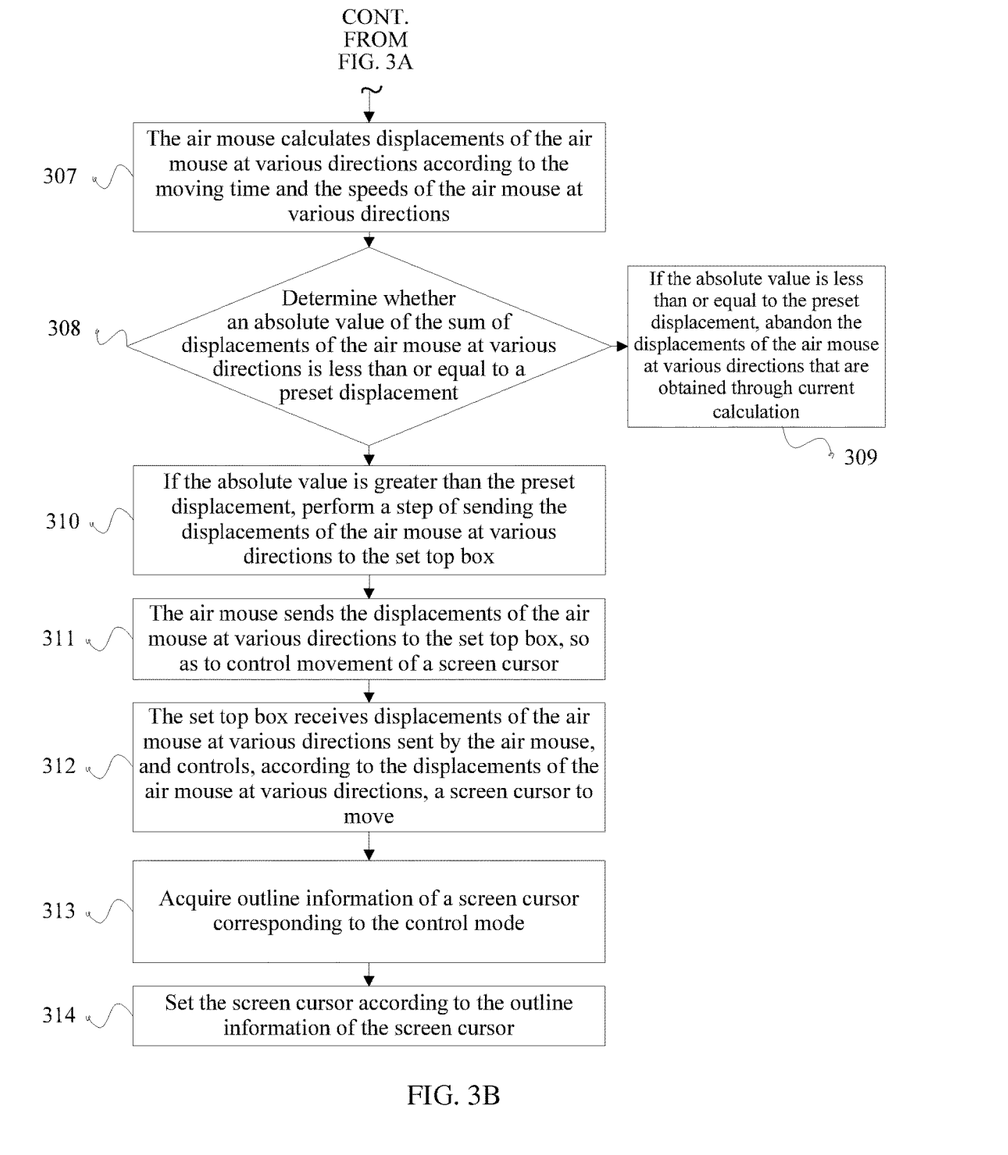

An embodiment of the present invention provides a method for controlling an air mouse. Referring to FIG. 3A and FIG. 3B, the method procedure includes the following steps.

301: A set top box receives an application switching instruction when an application is switched, where the application switching instruction carries a type of the application after switching.

When a user uses various applications through a set top box, the user usually performs switching between several applications. An application in the set top box may be a game application, a web page browsing application, a main window application (including a menu and a navigation bar), an input method application, and the like. Each application includes a type of an application of each application for identifying a type of the application currently being used by a set top box.

302: The set top box acquires a control mode corresponding to the type of the application, and sends the control mode to an air mouse.

After each application performs a switching operation, the set top box determines, according to the type of the application after switching, a type of the application currently being used, and determines, according to the type of the application, a control mode to which an air mouse needs to switch.

The control mode in the embodiment of the present invention may be divided into the following four kinds:

(1) main window application mode (including a menu and a navigation bar);
(2) input method application mode;
(3) game application mode; and
(4) web page browsing application mode.

A control mode to which an air mouse needs to switch is determined according to the type of the application currently being used, where types of the control modes include a main window application mode, an input method application mode, a game application mode, and a web page browsing application mode. The determined control mode is sent to the air mouse.

303: The air mouse receives a control mode of the air mouse sent by the set top box.

304: The air mouse acquires angular velocities and moving time of the air mouse at various directions.

An angular velocity of an X-axis and an angular velocity of a Y-axis of the air mouse during movement are acquired by using a gyroscope and a gravitational acceleration sensor built in the air mouse.

Moving time of the air mouse during the movement process is acquired at the same time, where the time is obtained by using a time difference between time when the air mouse starts to move and time when the air mouse stops. That is, assuming that a coordinate location of the screen cursor at t1 time is (x, y), and time that the air mouse stops after a displacement occurs is t2, the moving time $\Delta t=t2-t1$.

305: When the angular velocity of the air mouse at any direction is less than a preset threshold, set the angular velocity at the direction as zero.

Because the user performs mouse movements by holding the air mouse without supporting, a body jitter phenomenon is inevitable. In order to avoid unnecessary displacement to the air mouse and the screen cursor caused by the jitter phenomenon, an angular velocity threshold may be previously set, where a condition in which the angular velocity is less than the threshold is deemed to be that the user is not operating the air mouse. Further, the preset threshold may be angular velocities corresponding to the X-axis and the Y-axis respectively. Under normal conditions, it is set that when the angular velocity of the X-axis or the Y-axis is less than 5 degree/second, it is deemed to be that the user is not operating the air mouse.

The air mouse determines speeds of the air mouse at various directions according to the control mode and the angular velocities of the air mouse at various directions.

Each of the four modes described in step 302 has correspondences between the angular velocities and the speeds at the X-axis and the Y-axis, and a specific condition is as follows.

Figure 4:
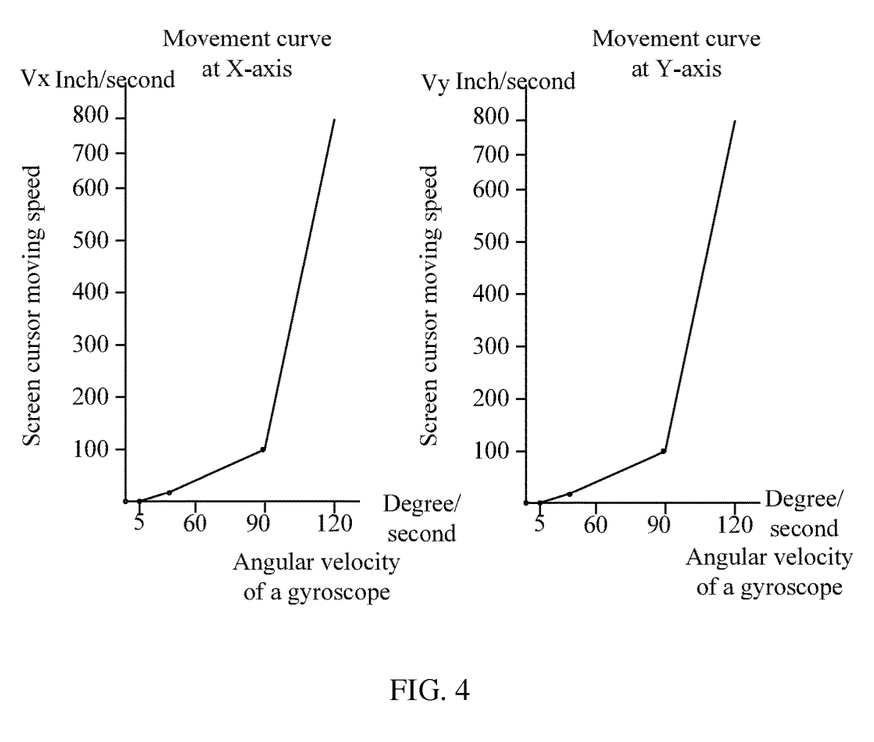
FIG. 4 is a control curve of a main window application mode of an air mouse according to Embodiment 3 of the present invention.

(1) Main window application mode (including a menu and a navigation bar).

The mode is used in program menu browsing, operations on a menu and a dialog box of an Internet television. Large icons are usually used to indicate a navigation bar, a menu, and a dialog box of an Internet television application, so as to lead the user to complete an operation of a function. A feature of the mode is that neither accurate positioning is required, nor fast movement is required. Change rules of the air mouse at the X-axis and the Y-axis are the same. Movement curves thereof are shown in FIG. 4.

Figure 5:
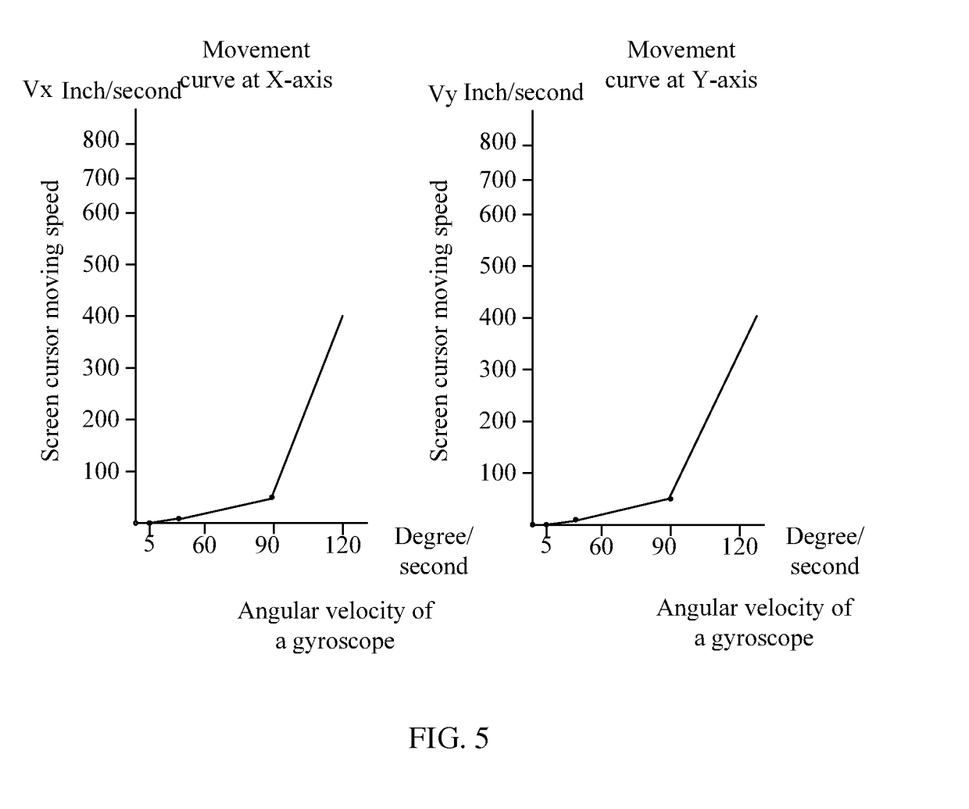
FIG. 5 is a control curve of an input method application mode of an air mouse according to Embodiment 3 of the present invention.

(2) Input method application mode.

The mode is used in a scenario in which an input method pops up in an edit box shown in an Internet television. The input method is shown as a soft keyboard at the television screen. When the user invokes an input method at any application, an air mouse control mode switching instruction is sent to the air mouse. The user switches to an air mouse control mode corresponding to the original application by sending the air mouse control mode switching instruction to the air mouse again after the user closes a soft keyboard after using the input method. The feature of the scenario is that the keyboard image of the input method is usually in a scope of 3-4 lines at the bottom of the screen, and is usually continuously arranged in images of the same size. Therefore, the air mouse mainly moves in the lower half of the screen, and it is required that moving speeds at the X-axis and the Y-axis cannot be too fast. Movement curves thereof are shown in FIG. 5.

Figure 6:
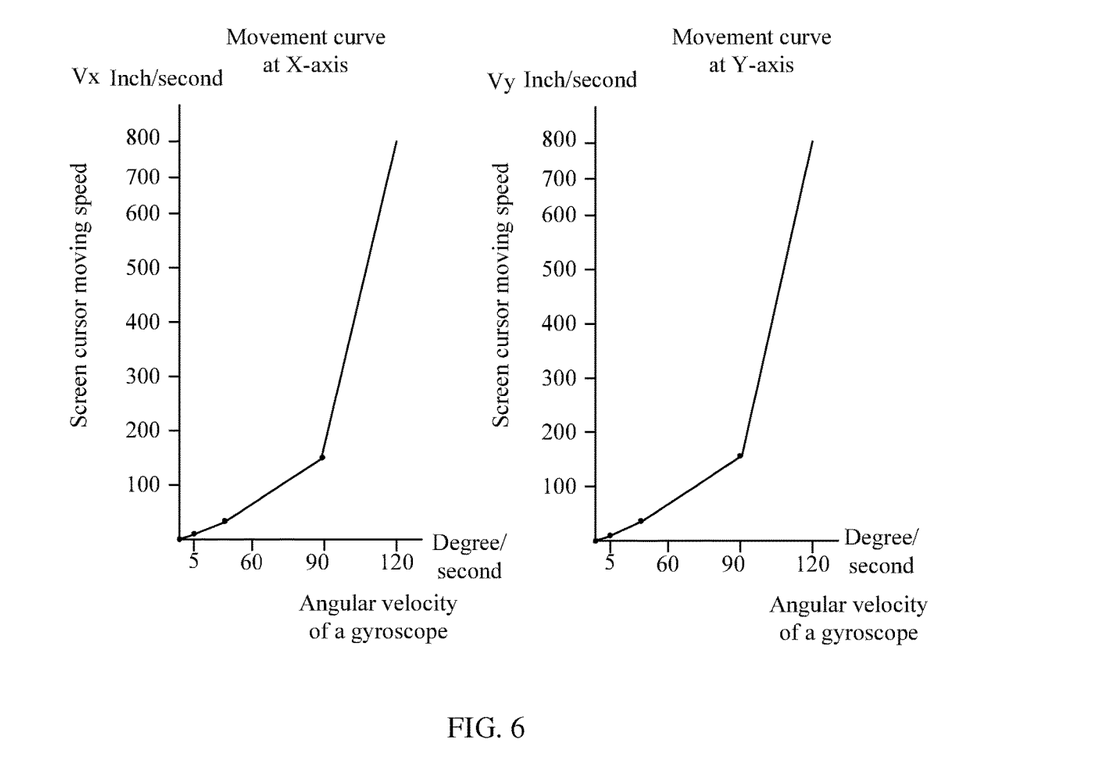
FIG. 6 is a control curve of a game application mode of an air mouse according to Embodiment 3 of the present invention.

(3) Game application mode.

The mode is mainly used in a game scenario in which a mouse needs to be moved fast. A feature of the mode is that no accurate positioning is required, but the mouse needs to be moved fast. Movement curves thereof are shown in FIG. 6.

Figure 7:
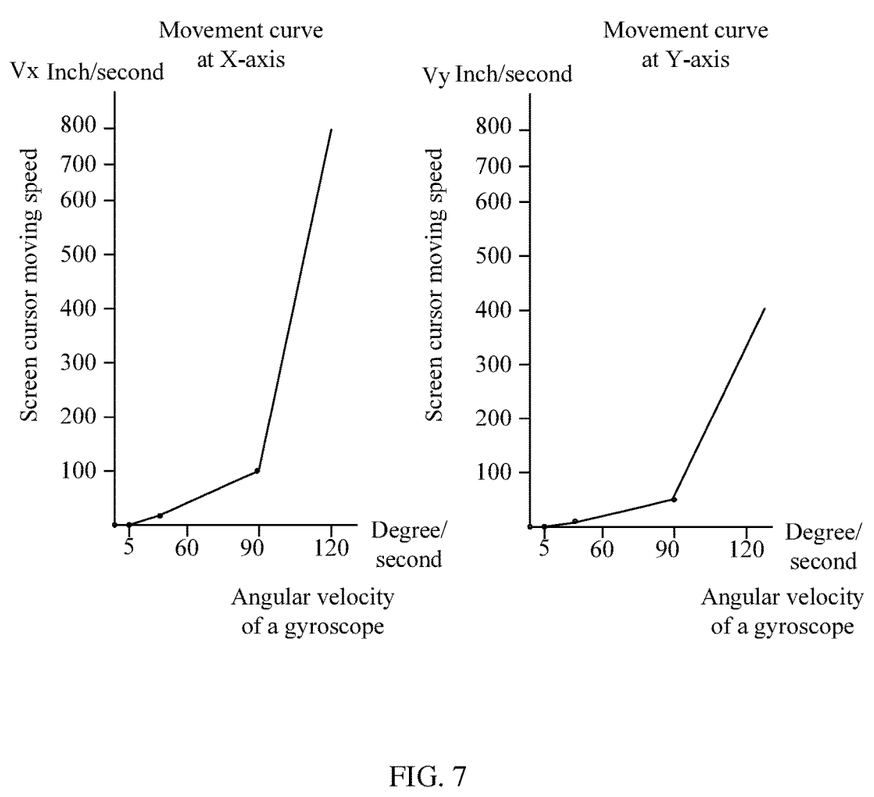
FIG. 7 is a control curve of a web page browsing application mode of an air mouse according to Embodiment 3 of the present invention.

(4) Web page browsing application mode.

The mode is used in a scenario in which a web page is browsed by using a browser in an Internet television. Content of the web page is dense when shown in an Internet television, and each line of the web page may have a web page link, which may be clicked by the user. A feature of the mode is: accurate positioning is required, fast movement may be performed at a horizontal direction of the X-axis, and accurate positioning may be performed at a vertical direction of the Y-axis. Movement curves thereof are shown in FIG. 7.

Control curves at various directions corresponding to the control mode are determined according to a control mode sent by a set top box, where the control curves are correspondences between the angular velocities and the speeds at various directions. Acquired angular velocities of the mouse at various directions are calculated separately according to respective correspondences between angular velocities and speeds of the X-axis and the Y-axis in the correspondences so as to obtain speeds at corresponding directions. That is, a speed Vx of the X-axis is determined according to the acquired angular velocity of the X-axis in the correspondences between angular velocities and speeds corresponding to the control mode, and a speed Vy of the Y-axis is determined according to the acquired angular velocity of the Y-axis in the correspondences between angular velocities and speeds corresponding to the control mode.

Therefore, the method may include the following.

3061: Acquire control curves at various directions corresponding to the control mode, where the control curves are correspondences between the angular velocities and the speeds.

3062: Determine speeds of the air mouse at various directions according to the correspondences between the angular velocities and the speeds and the acquired angular velocities of the air mouse at various directions.

307: The air mouse calculates displacements of the air mouse at various directions according to the moving time and the speeds of the air mouse at various directions.

A calculation manner of displacements $\Delta x$ and $\Delta y$ of an air mouse at various directions is that $\Delta x$ and $\Delta y$ are obtained through calculation by using moving time $\Delta t$ and moving speeds Vx and Vy of the air mouse: $\Delta x = Vx*\Delta t$, $\Delta y = Vy*\Delta t$.

308: Determine whether an absolute value of the sum of displacements of the air mouse at various directions is less than or equal to a preset displacement.

In a stabilization algorithm of an air mouse, a stabilization effect may be achieved by further restricting the $\Delta x$ and $\Delta y$ obtained through calculation. When movement of the screen cursor is controlled, $\Delta x$ and $\Delta y$ are pixel values of a screen cursor displacement. Therefore, $|\Delta x+\Delta y| \leq a$ preset pixel value is pre-set so as to restrict stabilization of the air mouse. Therefore, after the displacement of the air mouse is obtained through calculation, the displacement is determined again so as to check if the movement belongs to the scope of stabilization control.

Preferably, the preset pixel value is set to be 8 pixels, the distance between a human eye and a television set is usually at least 2-3 meters, and 8 pixels is $\frac{1}{60} \sim \frac{1}{80}$ for common 640*480 resolutions, and is $\frac{1}{240} \sim \frac{1}{135}$ for a high definition resolution 1920*1080 television, so that a visual and operational error caused to the user is not obvious.

309: If the absolute value is less than or equal to the preset displacement, abandon the displacements of the air mouse at various directions that are obtained through current calculation.

310: If the absolute value is greater than the preset displacement, perform a step of sending the displacements of the air mouse at various directions to the set top box.

311: The air mouse sends the displacements of the air mouse at various directions to the set top box, so as to control movement of a screen cursor.

312: The set top box receives displacements of the air mouse at various directions sent by the air mouse, and controls, according to the displacements of the air mouse at various directions, a screen cursor to move.

When a screen cursor is controlled to move, displacements $\Delta x$, $\Delta y$ are calculated according to an initial location (x, y) of the cursor and a location after the movement of the air mouse, so as to obtain a new cursor location, that is $(x+\Delta x, y+\Delta y)$.

313: Acquire outline information of a screen cursor corresponding to the control mode, where the outline information includes a shape and/or color of the screen cursor.

After different applications are switched to and the air mouse enters different modes, by changing the shape and/or color of the screen cursor, the user is informed of that a corresponding mode is entered.

314: Set the screen cursor according to the outline information of the screen cursor.

In the embodiment of the present invention, applications of different types are ran so as to change a control mode of a corresponding air mouse, thereby increasing efficiency of moving, by a user, a screen cursor through an air mouse when using an Internet television, and increasing human computer interaction efficiency.

Embodiment 4

Figure 8:
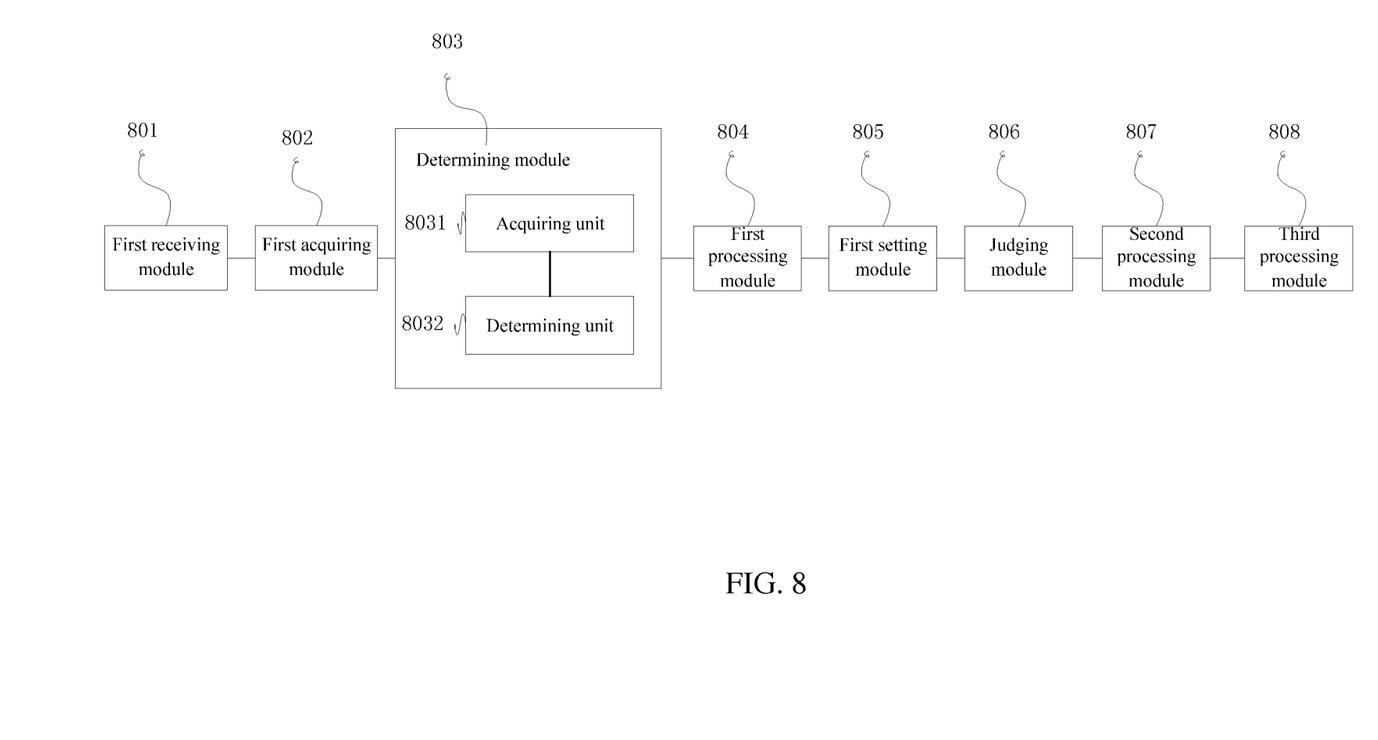
FIG. 8 is a schematic structural diagram of an air mouse for controlling an air mouse according to Embodiment 4 of the present invention.

An embodiment of the present invention provides an air mouse for controlling an air mouse. Referring to FIG. 8, the air mouse includes a first receiving module 801 configured to receive a control mode of an air mouse sent by a set top box; a first acquiring module 802 configured to acquire angular velocities and moving time of the air mouse at various directions; a determining module 803 configured to determine speeds of the air mouse at various directions according to the control mode and the angular velocities of the air mouse at various directions; and a first processing module 804 configured to calculate displacements of the air mouse at various directions according to the moving time and the speeds of the air mouse at various directions, and send the displacements of the air mouse at various directions to the set top box, so as to control movement of a screen cursor.

In a specific implementation manner, the determining module 803 includes an acquiring unit 8031 configured to acquire control curves at various directions corresponding to the control mode, where the control curves are correspondences between the angular velocities and the speeds; and a determining unit 8032 configured to determine speeds of the air mouse at various directions according to the correspondences between the angular velocities and the speeds and the acquired angular velocities of the air mouse at various directions.

The air mouse further includes a first setting module 805 configured to, when the angular velocity of the air mouse at any direction is less than a preset threshold, set the angular velocity at the direction as zero.

The air mouse further includes a judging module 806 configured to determine whether an absolute value of the sum of displacements of the air mouse at various directions is less than or equal to a preset displacement; a second processing module 807 configured to, if the absolute value is less than or equal to the preset displacement, abandon the displacements of the air mouse at various directions that are obtained through current calculation; and a third processing module 808 configured to, if the absolute value is greater than the preset displacement, perform a step of sending the displacements of the air mouse at various directions to the set top box.

In the embodiment of the present invention, applications of different types are ran so as to change a control mode of a corresponding air mouse, thereby increasing efficiency of moving, by a user, a screen cursor through an air mouse when using an Internet television, and increasing human computer interaction efficiency.

Embodiment 5

Figure 9:
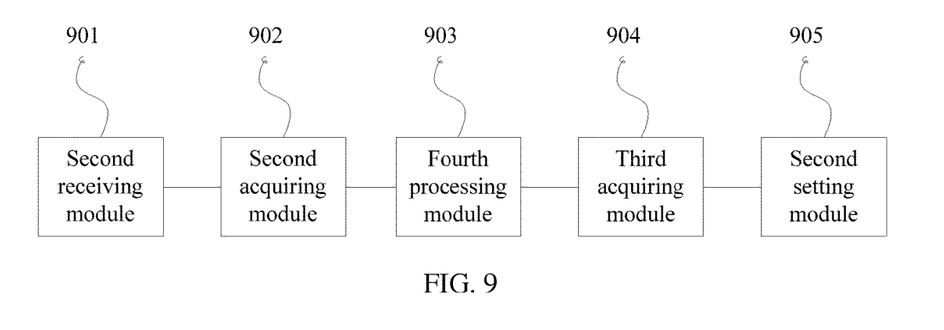
FIG. 9 is a schematic structural diagram of a set top box for controlling an air mouse according to Embodiment 5 of the present invention.

An embodiment of the present invention provides a set top box for controlling an air mouse. Referring to FIG. 9, the set top box includes a second receiving module 901 configured to receive an application switching instruction when an application is switched, where the application switching instruction carries a type of the application after switching; a second acquiring module 902 configured to acquire a control mode corresponding to the type of the application, and send the control mode to an air mouse; and a fourth processing module 903 configured to receive displacements of the air mouse at various directions sent by the air mouse, and control movement of a screen cursor according to the displacements of the air mouse at various directions.

In a specific implementation manner, the set top box further includes a third acquiring module 904 configured to acquire outline information of a screen cursor corresponding to the control mode, where the outline information includes a shape and/or color of the screen cursor; and a second setting module 905 configured to set the screen cursor according to the outline information of the screen cursor.

In the embodiment of the present invention, applications of different types are ran so as to change a control mode of a corresponding air mouse, thereby increasing efficiency of moving, by a user, a screen cursor through an air mouse when using an Internet television, and increasing human computer interaction efficiency.

Embodiment 6

Figure 10:
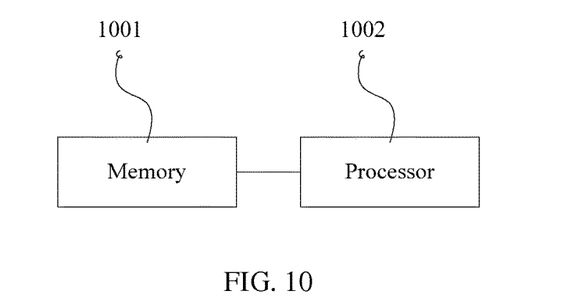
FIG. 10 is a schematic structural diagram of an air mouse for controlling an air mouse according to Embodiment 6 of the present invention.

An embodiment of the present invention provides an air mouse for controlling an air mouse. Referring to FIG. 10, the air mouse includes a memory 1001 and at least one processor 1002, where the processor 1002 is configured to perform the following operations: receiving a control mode of an air mouse sent by a set top box; acquiring angular velocities and moving time of the air mouse at various directions; determining speeds of the air mouse at various directions according to the control mode and the angular velocities of the air mouse at various directions; and calculating displacements of the air mouse at various directions according to the moving time and the speeds of the air mouse at various directions, and sending the displacements of the air mouse at various directions to the set top box, so as to control movement of a screen cursor.

The determining speeds of the air mouse at various directions according to the control mode and the angular velocities of the air mouse at various directions includes acquiring control curves at various directions corresponding to the control mode, where the control curves are correspondences between the angular velocities and the speeds; and determining the speeds of the air mouse at various directions according to the correspondences between the angular velocities and the speeds and the acquired angular velocities of the air mouse at various directions.

After the acquiring angular velocities and moving time of the air mouse at various directions, the method further includes, when the angular velocity of the air mouse at any direction is less than a preset threshold, setting the angular velocity at the direction as zero.

After the calculating displacements of the air mouse at various directions according to the moving time and the speeds of the air mouse at various directions, the method further includes determining whether an absolute value of the sum of displacements of the air mouse at various directions is less than or equal to a preset displacement; if the absolute value is less than or equal to the preset displacement, abandoning the displacements of the air mouse at various directions that are obtained through current calculation; and if the absolute value is greater than the preset displacement, performing a step of sending the displacements of the air mouse at various directions to the set top box.

In the embodiment of the present invention, applications of different types are ran so as to change a control mode of a corresponding air mouse, thereby increasing efficiency of moving, by a user, a screen cursor through an air mouse when using an Internet television, and increasing human computer interaction efficiency.

Embodiment 7

Figure 11:
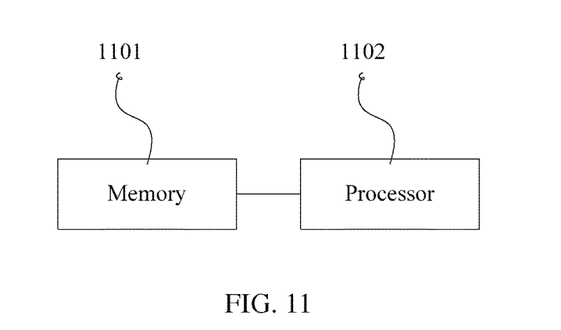
FIG. 11 is a schematic structural diagram of a set top box for controlling an air mouse according to Embodiment 7 of the present invention.

An embodiment of the present invention provides a set top box for controlling an air mouse. Referring to FIG. 11, the set top box includes a memory 1101 and at least one processor 1102, where the processor 1102 is configured to perform the following operations: receiving an application switching instruction when an application is switched, where the application switching instruction carries a type of the application after switching; acquiring a control mode corresponding to the type of the application, and sending the control mode to an air mouse; and receiving displacements of the air mouse at various directions sent by the air mouse, and controlling movement of a screen cursor according to the displacements of the air mouse at various directions.

After receiving displacements of the air mouse at various directions sent by the air mouse, and controlling movement of a screen cursor according to the displacements of the air mouse at various directions, the method further includes acquiring outline information of a screen cursor corresponding to the control mode, where the outline information includes a shape and/or color of the screen cursor; and setting the screen cursor according to the outline information of the screen cursor.

In the embodiment of the present invention, applications of different types are ran so as to change a control mode of a corresponding air mouse, thereby increasing efficiency of moving, by a user, a screen cursor through an air mouse when using an Internet television, and increasing human computer interaction efficiency.

A person of ordinary skill in the art may understand that all or a part of the steps of the embodiments may be implemented by hardware or a program instructing relevant hardware. The program may be stored in a computer readable storage medium. The storage medium may include a read-only memory, a magnetic disk, or an optical disc.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. A method for controlling an air mouse, comprising:
receiving a control mode of the air mouse sent by a set top box;
acquiring angular velocities and moving time of the air mouse at various directions;
determining speeds of the air mouse at various directions according to the control mode and the angular velocities of the air mouse at various directions;
calculating displacements of the air mouse at various directions according to the moving time and the speeds of the air mouse at various directions; and
sending the displacements of the air mouse various directions to the set op box to control movement of a screen cursor,
wherein after acquiring the angular velocities and the moving time of the air mouse at various directions, the method further comprises setting the angular velocity at a direction as zero when the angular velocity of the air mouse at any direction is less than a preset threshold.

2. The method according to claim 1, wherein determining the speeds of the air mouse at various directions according to the control mode and the angular velocities of the air mouse at various directions comprises:
acquiring control curves at various directions corresponding to the control mode, wherein the control curves are correspondences between the angular velocities and the speeds; and
determining the speeds of the air mouse at various directions according to the correspondences between the angular velocities, the speeds, and the acquired angular velocities of the air mouse at various directions.

3. The method according to claim 1, wherein after calculating the displacements of the air mouse at various directions according to the moving time and the speeds of the air mouse at various directions, the method further comprises:
determining whether an absolute value of a sum of displacements of the air mouse at various directions is less than or equal to a preset displacement;
abandoning the displacements of the air mouse at various directions that are obtained through current calculation when the absolute value is less than or equal to the preset displacement; and
performing a step of sending the displacements of the air mouse at various directions to the set top box when the absolute value is greater than the preset displacement.

4. An air mouse, comprising:
a non-transitory computer readable medium having instructions stored thereon; and
a computer processor coupled to the non-transitory computer readable medium and configured to execute the instructions to:
receive a control mode of the air mouse sent by a set top box;
acquire angular velocities and moving time of the air mouse at various directions;
determine speeds of the air mouse at various directions according to the control mode and the angular velocities of the air mouse at various directions;
calculate displacements of the air mouse at various directions according to the moving time and the speeds of the air mouse at various directions;
send the displacements of the air mouse at various directions to the set top box to control movement of a screen cursor; and
set the angular velocity at a direction as zero when the angular velocity of the air mouse at any direction is less than a preset threshold.

5. The air mouse according to claim 4, wherein the computer processor is configured to execute the instructions to:
acquire control curves at various directions corresponding to the control mode, wherein the control curves are correspondences between the angular velocities and the speeds; and
determine the speeds of the air mouse at various directions according to the correspondences between the angular velocities, the speeds, and the acquired angular velocities of the air mouse at various directions.

6. The air mouse according to claim 4, wherein the computer processor is configured to execute the instructions to:
determine whether an absolute value of a sum of displacements of the air mouse at various directions is less than or equal to a preset displacement;
abandon the displacements of the air mouse at various directions that are obtained through current calculation when the absolute value is less than or equal to the preset displacement; and
perform a step of sending the displacements of the air mouse at various directions to the set top box when the absolute value is greater than the preset displacement.

7. A method for controlling an air mouse, comprising:
receiving a control mode of the air mouse sent by a set top box;
acquiring angular velocities and moving time of the air mouse at various directions;
determining speeds of the air mouse at various directions according to the control mode and the angular velocities of the air mouse at various directions;
calculating displacements of the air mouse at various directions according to the moving time and the speeds of the air mouse at various directions; and
sending the displacements of the air mouse at various directions to the set top box to control movement of a screen cursor,
wherein after calculating the displacements of the air mouse at various directions according to the moving time and the speeds of the air mouse at various directions, the method further comprises:
determining whether an absolute value of a sum of displacements of the air mouse at various directions is less than or equal to a preset displacement;
abandoning the displacements of the air mouse at various directions that are obtained through current calculation when the absolute value is less than or equal to the preset displacement; and
performing a step of sending the displacements of the air mouse at various directions to the set top box when the absolute value is greater than the preset displacement.

8. An air mouse, comprising:
a non-transitory computer readable medium having instructions stored thereon; and
a computer processor coupled to the non-transitory computer readable medium and configured to execute the instructions to:
  receive a control mode of the air mouse sent by a set top box;
  acquire angular velocities and moving time of the air mouse at various directions;
  determine speeds of the air mouse at various directions according to the control mode and the angular velocities of the air mouse at various directions;
  calculate displacements of the air mouse at various directions according to the moving time and the speeds of the air mouse at various directions;
  send the displacements of the air mouse at various directions to the set top box to control movement of a screen cursor;
  determine whether an absolute value of a sum of displacements of the air mouse at various directions is less than or equal to a preset displacement;
  abandon the displacements of the air mouse at various directions a are obtained through current calculation when the absolute value is less than or equal to the preset displacement; and
  perform a step of sending the displacements of the air mouse at various directions to the set top box when the absolute value is greater than the preset displacement.

* * * * *

UNITED STATES PATENT AND TRADEMARK OFFICE
CERTIFICATE OF CORRECTION

| | | |
|---|---|---|
| PATENT NO. | : 9,547,379 B2 | |
| APPLICATION NO. | : 14/565829 | |
| DATED | : January 17, 2017 | |
| INVENTOR(S) | : Rao Fu and Jun Lu | |

It is certified that error appears in the above-identified patent and that said Letters Patent is hereby corrected as shown below:

In the Claims

Column 11; Line 23; Claim 1 should read:
"sending the displacements of the air mouse at various directions to the set top box to control movement of a screen cursor"

Column 13; Line 24; Claim 8 should read:
"abandon the displacements of the air mouse at various directions <u>that</u> are obtained through current calculation when the absolute value is less than or equal to the preset displacement; and"

Signed and Sealed this
Eighteenth Day of April, 2017

Michelle K. Lee
*Director of the United States Patent and Trademark Office*